UNITED STATES PATENT OFFICE.

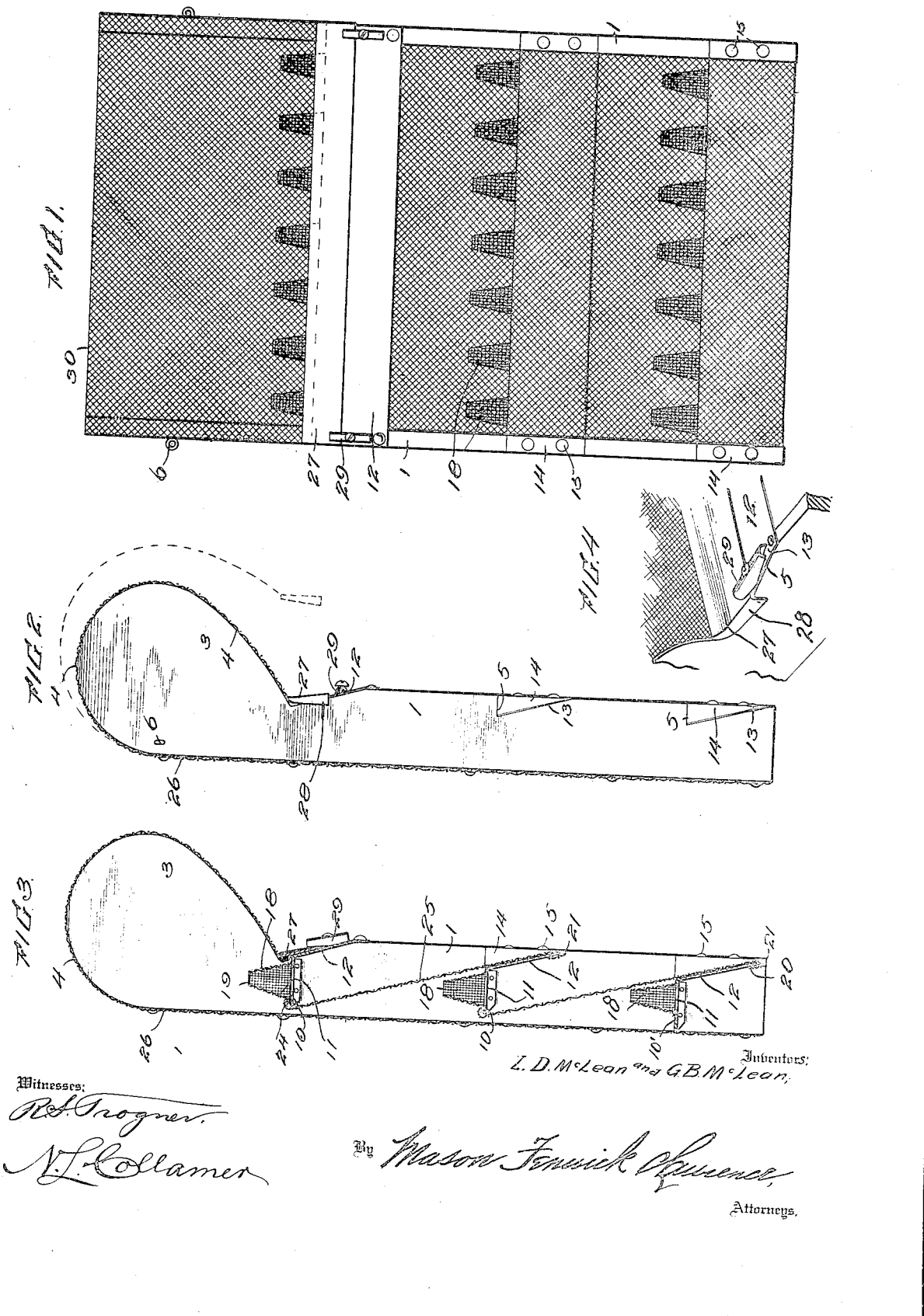

LEONARD D. McLEAN AND GEORGE B. McLEAN, OF ELIZABETH, ILLINOIS.

FLY-TRAP.

1,131,535.  Specification of Letters Patent.  Patented Mar. 9, 1915.

Application filed September 19, 1914. Serial No. 862,589.

*To all whom it may concern:*

Be it known that we, LEONARD D. McLEAN and GEORGE B. McLEAN, citizens of the United States, residing at Elizabeth, in the county of Jo Daviess and State of Illinois, have invented certain new and useful Improvements in Fly-Traps; and we do hereby declare the following to be a full, clear, and exact description of the invention, such as will enable others skilled in the art to which it appertains to make and use the same.

This invention relates to traps, and more especially to those intended for insects such as flies and mosquitos, although it is primarily intended as a fly trap adapted to be hung on the inside or outside of a screen door or window, while yet being susceptible of amplification by means of a suitable frame so that it becomes itself a screen door.

The object of the present invention is to improve and strengthen a fly trap of this character.

The invention consists in the details hereinafter set forth and claimed, and as shown in the drawings wherein:—

Figure 1 is a front elevation of this improved fly trap, and Fig. 2 is a side elevation thereof with the door or cover of the cage shown in dotted lines as open. Fig. 3 is a vertical central section. Fig. 4 is a perspective detail.

One of the objects of the present invention is to build a trap of this character having as few parts as possible for the sake of neatness, simplicity, and lightness—the latter in order that it may be hung upon a screen door or window so that flies and other insects within the room or outside the building will be automatically trapped. With this general end in view, we prefer that the only wood employed (and in fact the parts about to be described might be of metal) shall be the two side bars which comprise upright strips 1 of wood, from one inch to two inches wide and as long as may be necessary, which strips are enlarged at their upper ends into what might be called wings 3 rounded on their edges as shown at 4 in Fig. 2; and which strips are also notched at intervals down their front edges as shown at 5, for a purpose to appear hereinafter. The cross elements and the screen wire which connect these sides will be sufficient without any other wooden element or framing, but we may say at this point that—although it is hardly necessary to illustrate the same—we contemplate in some instances making the sides long enough to become the side bars of a door-frame, in which case there would be top and bottom cross bars so as to give stability thereto, and the entire door could be hung in a doorway and would become in effect a screen door. However, ordinarily the trap is proportioned about as illustrated in Fig. 1, and its side bars may be provided with eyes or other devices 6 whereby it can be hung upon a screen door or window by means of hooks, strings, or other supporting members.

In its preferred construction the trap has its side bars connected by a number of transverse elements which are preferably of sheet metal such as tin, and each of such elements comprises a flat leaf or partition 10 pierced with a number of holes 11, and a depending and slightly oblique skirt 12 at the front edge of this partition, the extremities 13 of this skirt being extended a little beyond the extremities of the partition so that they will lie in the notches 5. Over said extremities blocks or fillers 14 are placed to fill out the notches 5, and the blocks are held removably in place by nails or screws 15 so that the side bars are thus connected by the transverse elements which therefore constitute parts of the framework, the front edges of the side bars are filled out to preserve their uniformity of appearance, and yet the transverse elements are removable as for substitution or repair. In the upper leaf or partition 10 are several holes 11, over each of which is mounted a truncated cone 18 of wire mesh whose reduced and open apex 19 is of a size to permit the passage of a fly but whose larger end conforms with the size of the hole in the partition so that the flies may pass freely therethrough as usual in traps of this character.

Referring now to the sectional view, Fig. 3, it will be seen that the lowermost partition 10′ extends at its rear edge back to a line coincident with the rear edges of the sides 1, whereas with all the partitions the angle between them and their skirt stands in rear of the front edges of said sides. With this exception the transverse elements are alike, as also is the attachment of the screening thereto, excepting with respect to the upper element.

The front of this trap is divided into a number of panels made of wire screening, and as these are alike a description of one will be sufficient. Beginning then behind the skirt 12 at the point 20, the sheet of wire screening 25 is carried down around the lower edge of this skirt as at 21, and thence upward across its outer face and obliquely to the rear, over the rear edge of the partition 10 next above at the point 24, and secured upon this partition in rear of and between the cones as seen at 24. The panel next above follows the same course, and so on for as many panels as are employed, excepting that the uppermost transverse element which stands at the bottom of the cage has no screen panel rising from it.

The numeral 26 designates the rear of this trap, which consists of a sheet of netting attached at its sides to the rear edges of the side strips, and extending from the lower ends thereof upward throughout their length, over their curved upper edges 4, and down the front edges of the wings 3 to a transverse metal strip for selvage 27, behind which they are secured in any suitable manner. Both ends of this strip are bent at the rear into lips 28 which, when the strip overlies the uppermost skirt 12, stand against the side faces of the sides of the frame; and buttons or similar fastening devices 29 mounted on the front edges of said frame—preferably over the uppermost skirt 12—are adapted to be turned into engagement with the front face of the strip 27 to hold this sheet of netting in place. Said netting at its upper end therefore constitutes the body of a cage 30, which reference numeral is employed to designate the entire portion of the trap surrounded by the upper end of this sheet and located between the two wings 3. The rear edges of the latter are coincident with the rear edges of the sides, their upper edges curve over to the front as shown at 4, and their front edges merge into the upper front edges of the side strips; and therefore when the upper end of this long sheet of screening is borne over to the front and its selvage strip 27 fastened in place, the cage is complete. When a number of flies have been trapped and have collected within this cage, the entire trap is removed from its position and the insects killed in any suitable way, after which the buttons are turned and the "door" of the cage is opened to dump out the carcasses.

The use of this trap will now be obvious. Assuming that it is constructed as best illustrated in Figs. 1 and 2 of the drawings, it is hung upon a screen door or window, inside the room or outside, and no bait or lure is necessary. The well-known tendency of flies and other insects to seek the light will cause those that are inside the house to fly toward the trap, and the well-known tendency of flies to get into the house toward dusk will cause them to fly from outdoors toward the trap if it hangs on the outside of the door or window. Lighting upon one of the front panels they find their progress impeded, and crawling upward are trapped behind one of the skirts 12. Next they pass upward through the holes in its partition and the cones mounted thereon, and then yet farther upward behind the partition next above, where they eventually reach a position within the cage in which they collect in numbers. No fly ordinarily will travel downward, and the use of sheet metal for the skirt 12 darkens the inlets to the cones, whereas the latter being of wire screening are light, and the result is that the upper progress of the flies is induced rather than retarded.

We do not wish to be limited to the proportions or the materials of this trap, nor to the details further than as covered by the appended claim. Nor would we care to be restricted to building the trap in the form illustrated, as it might be amplified to and used as a screen door.

What we claim as new is:—

In a fly trap, the combination with two upright side bars consisting of strips made straight at their rear edges and curved at their upper ends, the bars being enlarged near their upper portion into wings, a series of transverse elements each having holes, a series of front panels of wire screening connecting the front edge of one element with the rear edge of the element above, and means for connecting the upright and transverse elements; of a sheet of screening connecting and secured to the rear edges of said side bars and extending over their curved upper edges and left free where it overlies said wings, a sheet metal strip secured across the free upper end of said sheet of screening and having rearwardly turned lips at its extremities, and fastening devices on the uppermost transverse element adapted to engage said strip, for the purpose set forth.

In testimony whereof we affix our signatures in presence of two witnesses.

LEONARD D. McLEAN.
GEORGE B. McLEAN

Witnesses:
S. B. REYNOLDS,
A. E. MOUGIN.